United States Patent
Krzys et al.

[11] Patent Number: 5,828,032
[45] Date of Patent: Oct. 27, 1998

[54] PROCESS FOR BUTT WELDING TWO METAL BLANKS AND A MOTOR VEHICLE PART OBTAINED BY SAID PROCESS

[75] Inventors: Jean-Marc Krzys; Hugues Oberlé; Gilles Peru, all of Dunkerque; Pascal Verrier, Lumbres, all of France

[73] Assignee: Sollac, Puteaux, France

[21] Appl. No.: 627,013

[22] Filed: Apr. 3, 1996

[30] Foreign Application Priority Data

Apr. 4, 1995 [FR] France .................................. 95 03972

[51] Int. Cl.⁶ .................................................. B23K 26/00
[52] U.S. Cl. ........................................ 219/121.64; 428/594
[58] Field of Search .................. 219/121.13, 121.14, 219/121.63, 121.64, 118; 428/594, 653; 296/188

[56] References Cited

U.S. PATENT DOCUMENTS

| | | | |
|---|---|---|---|
| 4,281,235 | 7/1981 | Peloquin | 219/121.64 |
| 4,628,178 | 12/1986 | Miyake et al. | 219/121.64 |
| 4,644,126 | 2/1987 | Schumacher | 219/121.64 |
| 5,343,014 | 8/1994 | Ogino et al. | 219/121.64 |
| 5,399,834 | 3/1995 | Guth | 219/121.64 |

FOREIGN PATENT DOCUMENTS

| | | |
|---|---|---|
| 0 023 174 A1 | 1/1981 | European Pat. Off. . |
| 3117527 A1 | 11/1982 | Germany . |
| 58-070985 | 4/1983 | Japan . |
| 59-030489 | 2/1984 | Japan . |
| 5-131283 | 5/1993 | Japan .................................. 219/121.64 |

OTHER PUBLICATIONS

French Search Report Dated Nov. 29, 1995.

*Primary Examiner*—Geoffrey S. Evans
*Attorney, Agent, or Firm*—Oblon, Spivak, McClelland, Maier & Neustadt, P.C.

[57] ABSTRACT

Process for butt welding two metal blanks(1,2) of which the first blank is of steel and the second blank is of a metal having a melting temperature lower by more than 400° C. than the melting temperature of the steel. The process includes positioning the two metal blanks (1,2) so that they contact each other in the region of their lateral faces to be butted together, maintaining the two metal blanks in contact, directing onto one of the principal faces of the metal blank (1) a high energy density bean (5) which passes through the first metal blank (1) and of which the focusing point is situated at a given distance from the joint plane (3) so as to generate in the region of the joint plane (3) a temperature equal to the melting temperature of the second metal blank (2) to within 10%, and displacing the high energy density beam (5). This process is applicable to the welding of two metal blanks of which one is of steel and the other is of aluminium or aluminium alloy for producing a motor vehicle part, in particular a body and structural part.

21 Claims, 2 Drawing Sheets

PROCESS FOR BUTT WELDING TWO METAL BLANKS AND A MOTOR VEHICLE PART OBTAINED BY SAID PROCESS

BACKGROUND OF THE INVENTION

1. Field of the Invention

The present invention relates to a process for welding two metal blanks of which one is of steel and the other is of a metal whose melting temperature is lower by more than 400° C. than the melting temperature of the steel.

The invention also relates to a motor vehicle part, in particular a body or structural part, obtained by said process.

2. Discussion of the Background Art

In many industrial applications the materials of the manufactured product are different from one another and are employed in accordance with the properties of each one.

This is increasingly so in the manufacture of certain motor vehicle parts for the purpose of rendering the latter lighter to reduce fuel consumption.

Indeed, all the regions of a given part are not subjected to the same forces and the same stresses, such as for example the floors of vehicles, the elements of the body or the suspension cups.

Consequently, motor vehicle constructors have a tendency to use for this type of parts in the regions requiring a deep drawing operation and/or welding operations, steel blanks and in the other regions metal blanks of aluminium or aluminium alloy.

It is known that steel has a good press drawing capability, good mechanical properties and a high density, while aluminium or aluminium alloys have a good wire drawing capability, low mechanical properties and a low density.

This is also the case in the field of the construction of methane carriers in which the storage of the methane is effected at very low temperature.

Now, it is known that steel loses its mechanical properties since the storage of methane is effected at a temperature lower than the ductile-fragile transition temperature of the steel which is between −30° and −60° C. for standard steels.

On the other hand, the mechanical properties of aluminium have rather a tendency to improve at low temperatures.

Consequently, it is attractive proposition to employ metal blanks of aluminium or aluminium alloy for the vessel itself and metal blanks of steel for the structure of this vessel.

The most interesting method for assembling these metal blanks composed of two different materials is the welding method since it avoids the addition of component parts, such as screws or rivets, and there is no additional filler material for making up the weld when the latter is effected by seam welding, spot welding or a high energy density beam.

These assembling methods as compared with solutions with the addition of component parts also permit reducing galvanic corrosion.

However, the welding of two different materials, for example steel with aluminium or steel with aluminium alloy presents problems and involves controlling the following factors:

putting the two materials at the required temperatures preparing the surfaces to be welded, i.e. eliminating impurities and oxides, achieving the assembly under suitable conditions of temperature and cleanliness.

Heretofore several welding methods have been employed for assembling two different materials.

One of these methods is co-rolling which comprises heating the region to be welded by a high frequency current and applying the two materials against each other by means of rolling rolls.

This method is applicable when it is desired to employ transition joints, but is not applicable for the welding of a plate of aluminium or aluminium alloy to a steel structure.

Another method is employed for welding two bars of which one is of steel and the other is of aluminium, which comprises heating the ends to be welded of the two bars, putting these two ends in contact with each other, and passing a high alternating current through the bars.

The assembly of the bars is achieved by means of a projectile which propels one of the bars against the other.

However, the heating time is relatively long and this may markedly modify the characteristics of the steel and the aluminium.

Further, this method is still a spot welding and therefore a discontinuous method.

Another method is also known which is the spot welding method, but, it also has the principal disadvantage of being discontinuous.

Explosion welding is also known which comprises putting the two sheets one on top of the other and providing therebetween a controlled space, and then depositing on the upper sheet a layer of explosive.

The detonation is initiated at one of the corners or edges and, by its propagation it causes the projection of the upper sheet against the lower sheet.

This method requires large uninhabited spaces or the construction of armoured premises which limits the size of the sheet to be welded.

Friction welding is also known which comprises, in a first stage, supplying heat by friction of the two parts to be assembled, and then forging these two parts.

However, with this method, the deforming effects must be attenuated by heat treatments which may cause the formation of intermetallic compounds at the interface.

Further, bearing in mind the magnitude of the pressure to be developed when forging, the welded area can hardly exceed a few tens of square centimeters.

Lastly, diffusion welding is known which has for drawback to require a long welding time which constitutes a serious obstacle in the industrialisation of this method.

These various methods are not applicable to the butt welding of two metal blanks of which one is of steel having a melting temperature which is lower by 400° C. than the melting temperature of the other metal blank for producing butt welded blanks at high production rates.

Indeed, the butt welding of two metal blanks of which one is of steel and the other is of aluminium or aluminium alloy presents problems which reside, on one hand, in the fact that the melting temperature of the steel is, depending on the grades, between 1450° and 1700° C. whereas the melting temperature of aluminium is between 550° and 750° C. and, on the other hand, in the fact that intermetallic compounds are formed in the region of the interface of the two metal blanks.

SUMMARY OF THE INVENTION

An object of the invention is to provide a process for butt welding whereby it is possible to obtain assemblies between two metal blanks of which one is of steel and the other is of a metal whose melting temperature is lower by more than 400° C. than the melting temperature of the steel, such as for example blanks of steel and aluminium or aluminium alloy, for producing assemblies which may be used for industrial applications requiring drawability characteristics of the metal blanks and low manufacturing cost.

The invention therefore provides a process for butt welding two metal blanks of which the first blank is of steel and the second blank is of a metal whose melting temperature is lower by more than 400° C. than the melting temperature of the steel, characterised in that it comprises;

positioning the two metal blanks so that they are in contact at their lateral faces to be butt joined, maintaining the two metal blanks in contact by clamping means, directing onto one of the principal faces of the first metal blank a high energy density beam passing through said first metal blank and having a focusing point P situated at a given distance from the joint plane so as to generate in the region of said joint plane a temperature equal to the melting temperature θ2 of the metal of the second blank to within 10%, displacing the high energy density beam in a direction parallel to the joint plane so as to form a welded joint at the butt joined lateral faces of the two metal blanks.

According to other features of the invention;

the distance between the vertical axis passing through the focusing point of the high energy density beam and the joint plane is between 5 and 50% of the thickness of the thinnest metal blank and preferably between 20 and 40%, which corresponds, for metal blanks having a thickness of 1 mm, to a distance of between 0.2 and 0.4 mm, the optimum distance between the vertical axis passing through the focusing point of the high energy density beam and the joint plane is determined by the following formula:

$$d_{opt} = \frac{\sqrt{2/\pi e} \times P}{(T_f - T_o) \times 2 \times e_p \times \rho \times c}$$

in which:

P is the linear energy required for melting the volume described by the melted region of the welding.

e is the Napierian log of 10, $T_f$ is the melting temperature of the metal of the second metal blank, $T_o$ is the ambient temperature, $e_p$ is the thickness of the first steel blank, ρ is the density of the steel, c is the specific heat of the steel.

the two metal blanks are maintained in contact in the vicinity of the joint plane of these metal blanks, there is exerted, during the maintenance of the two metal blanks, a lateral pressure in a direction towards the joint plane so as to take up machining clearances in the region of the joint plane, the process comprises, during the formation of the welded joint, exerting on the joint plane a forging pressure in a direction towards said joint plane for expelling the oxides, the impurities, and the intermetallic compounds formed in the region of said joint plane, the process comprises inclining the axis of the high energy density beam at an angle of between 1° and 5°, the metal of the second blank is aluminium or aluminium alloy, the process comprises for limiting the growth of the intermetallic compounds during the formation of the welded joint, vaporizing a protective gas in the region of the joint plane and on each side of the two metal blanks, the process comprises for limiting the growth of the intermetallic compounds during the formation of the welded joint, providing an external supply of elements inhibiting the intermetallic compounds, the process comprises vaporizing in the region of the joint plane and on each side of the two metal blanks a protective gas and simultaneously providing in the region of said joint plane an external supply of elements inhibiting the intermetallic compounds for limiting the growth of said intermetallic compounds, the protective gas is selected from the group comprising nitrogen and carbon dioxide, the inhibiting elements are selected form the group comprising zinc, silicon, strontium, and silver.

The invention also provides a motor vehicle part, in particular a body or structural part, characterized in that it is shaped from a metal blank constituted by at least two elementary blanks, the first elementary blank being of steel and the second elementary blank being of a metal whose melting temperature is lower by more than 400° C. than the melting temperature of the steel of the first elementary blank, and said elementary blanks are butt welded by the aforementioned process.

According to other features:

the metal of the second elementary blank is aluminium or aluminium alloy, the part is shaped by a drawing operation.

BRIEF DESCRIPTION OF THE DRAWINGS

Features and advantages of the invention will be apparent from the following description which is given solely by way of example with reference to the accompanying drawings, in which.

DESCRIPTION OF THE PREFERRED EMBODIMENTS

Figure 1:
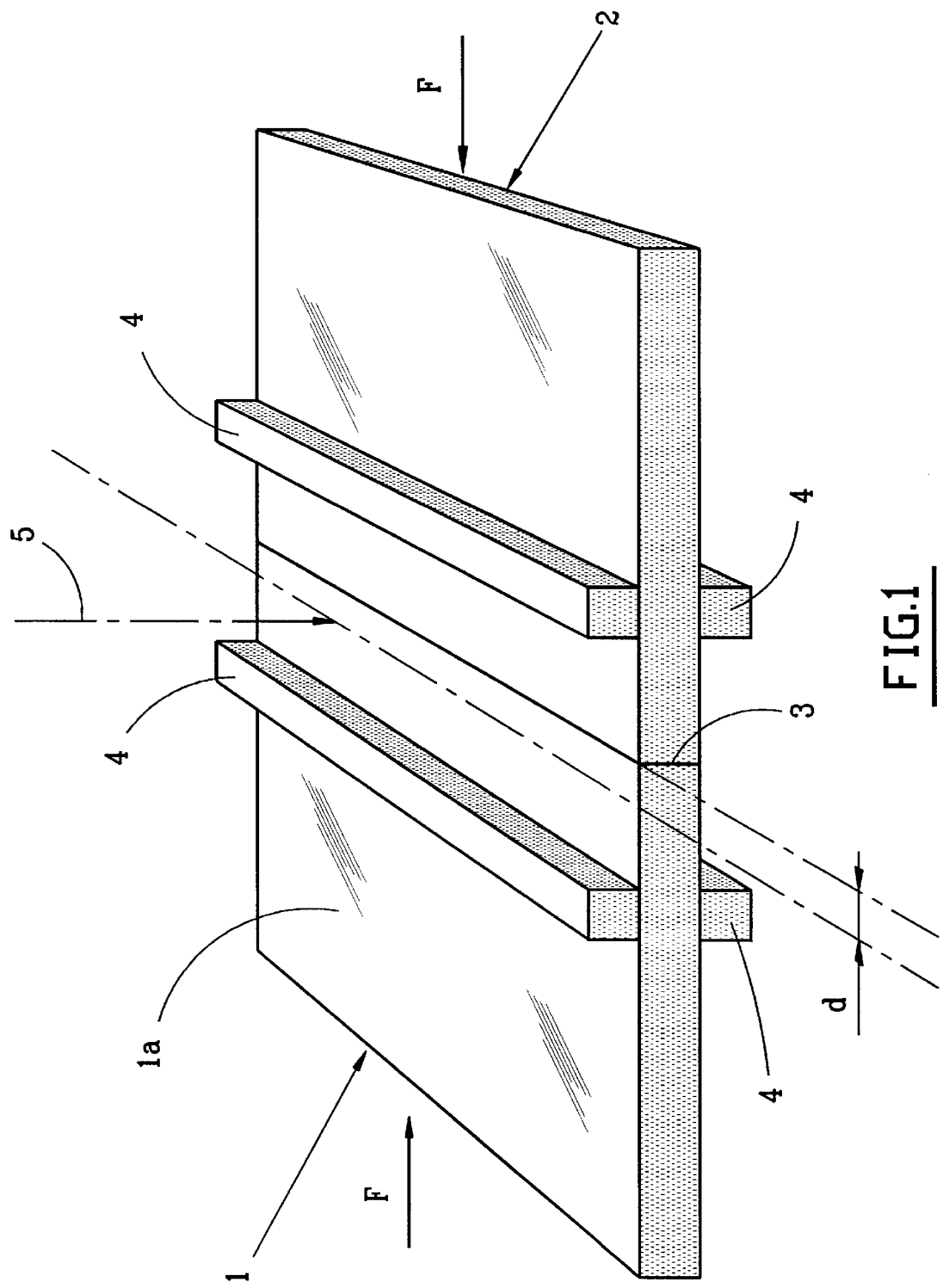
FIG. 1 is a diagrammatic perspective view of the welding of two metal blanks by the process according to the invention.

As shown in the Figures, the process according to the invention is a process for welding two metal blanks 1 and 2 which are placed edge to edge in the region of the lateral faces to be welded so as to form a joint plane 3.

The two metal blanks 1 and 2 may have the same thickness or have different thicknesses.

The process according to the invention generally relates to the welding of two metal blanks of which the first blank, for example the metal blank 1, is of steel and the second metal blank 2 is of a metal whose melting temperature θ2 is lower by more than 400° C. than the melting temperature θ1 of the steel.

Hereinafter, and solely by way of example, the metal of the blank 2 is aluminium or an aluminium alloy having a melting temperature θ2 of between 550° and 700° C. while the melting temperature θ1 of the steel is between 1450° and 1700° C., depending on the grades.

The steel of the metal blank 1 may be, for example, a low carbon steel, a mild or soft steel, a stainless steel, or a steel having a high yield strength.

After having positioned the two metal blanks 1 and 2 so that they are in contact at their lateral faces to be butt welded, the two metal blanks 1 and 2 are maintained in contact by clemping means consisting of for example clamping bars 4 placed on the principal faces of each metal blank 1 and 2.

The metal blanks 1 and 2 are maintained in the vicinity of the joint plane 3 at a distance of between 5 and 10 mm from the latter.

A high energy density beam is then directed onto the principal face la of the metal blank 1.

Figure 2:
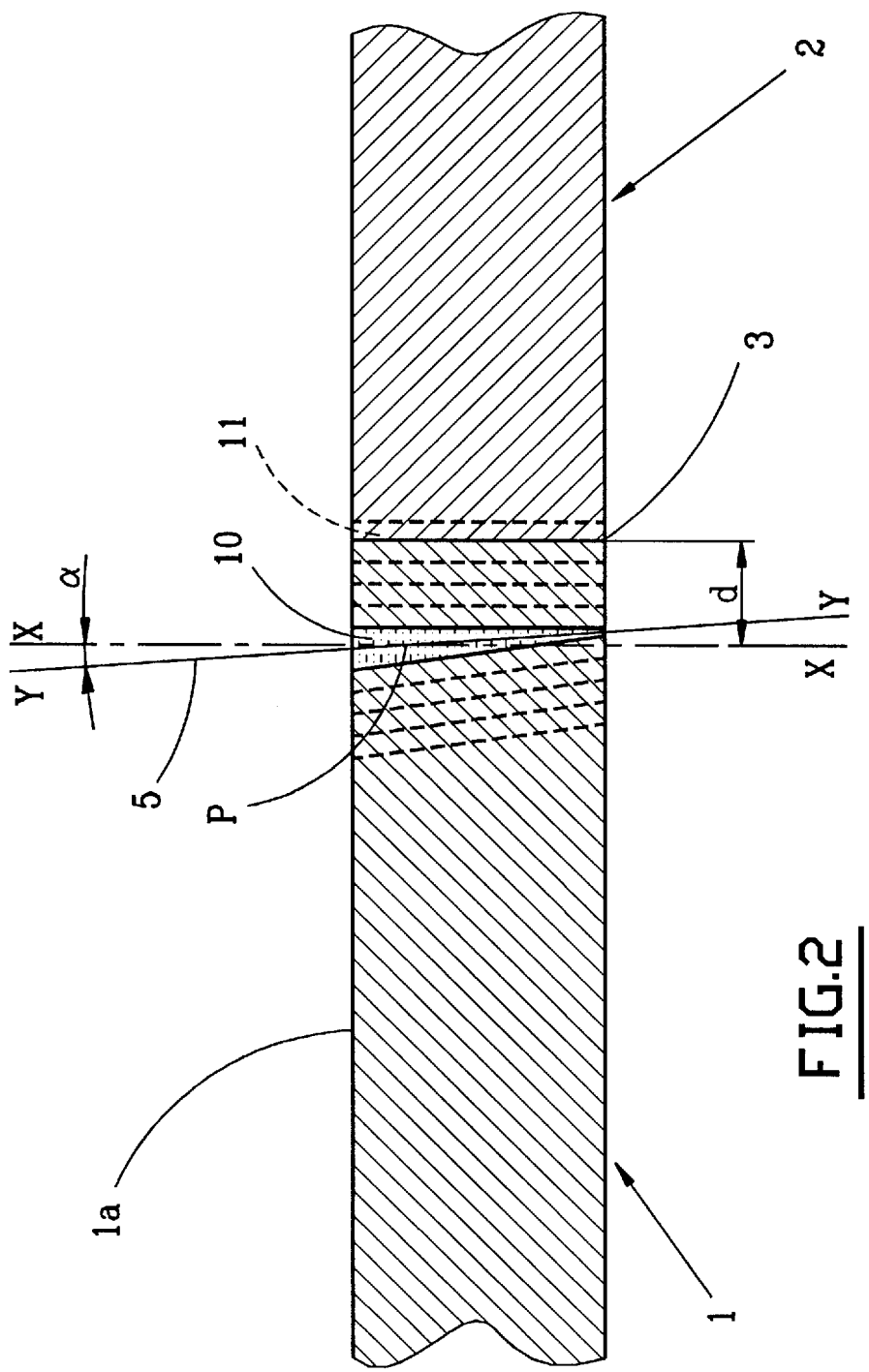
FIG. 2 is a diagrammatic cross-sectional view of the two metal blanks during the welding by the process according to the invention.

As shown in FIG. 2, the high energy density beam 5 passes through the metal blank 1 and its focusing point P is situated substantially at one-third of the thickness of the metal blank 1 below the principal face la of the metal blank 1 onto which the high energy density beam 5 is directed, and at a given distance d from the joint plane 3 so that there is generated in the region of said joint plane 3 a temperature equal to the melting temperature θ2 of the aluminium or aluminium alloy of the second metal blank 2 to within 10%.

The high energy density beam 5 is displaced in a direction parallel to the joint plane 3 so as to produce a welded joint in the region of the butt joined lateral faces of the two metal blanks 1 and 2.

During the maintenance of the two metal blanks 1 and 2, a lateral pressure F is exerted in a direction towards the joint plane 3 on said metal blanks 1 and 2 for taking up the machining clearances at the joint plane 3.

In the case where the two metal blanks 1 and 2 have the same thickness, the distance d between the vertical axis X—X passing through the focusing point P of the high energy density beam 5 and the joint plane 3 is between 5 and 50% of the thickness of the metal blanks and preferably between 20 and 40%.

In the case where the two metal blanks 1 and 2 do not have the same thickness, the distance between the vertical axis passing through the focusing point P of the high energy density beam 5 and the joint plane 3 is between 5 and 50% of the thickness of the thinnest metal blank and preferably between 20 and 40% of said thickness.

For metal blanks having a thickness of 1 mm or for metal blanks of which one has a thickness less than the thickness of the other metal blank and is equal to 1 mm, the distance between the vertical axis passing through the focusing point P of the high energy density beam 5 and the joint plane 3 is between 0.2 and 0.4 mm.

The optimum distance between the vertical axis X—X passing though the focusing point P of the high energy density beam 5 and the joint plane 3 is determined by the following formula:

$$d_{opt} = \frac{\sqrt{2/\pi e} \times P}{(T_f - T_o) \times 2 \times e_p \times \rho \times c}$$

in which:

P is the linear energy required for melting the volume described by the melted region of the weld.

e is the Napierian log of 10, $T_f$ is the melting temperature of the metal of the second blank, $T_o$ is the ambient temperature, $e_p$ is the thickness of the first steel blank, $\rho$ is the density of the steel, c is the specific heat of the steel.

For calculating the energy P the following formula may be used:

$$P = Z \times \rho \times e_p \times (C \times \Delta T \times \Delta H)$$

in which:

Z is the width of the melted region, $\rho$ is the density of the steel, $e_p$ is the thickness of the first metal blank, $\Delta T = T_f - T_o$, $\Delta H$ is the free enthalpy for the liquid phase to solid phase change of the steel of the blank of steel, By way of example:

P=3,3 KJ/m e=1n10

$T_f$=670° C.

$T_o$=20° C.

$e_p$=1.10$^{-3}$ m $\rho$=7,8.10$^3$ kg/m$^3$ c=420 J/kg°C., which gives, in applying the aforementioned formula, an optimum distance of 0.4 mm.

As can be seen in FIG. 2, the high energy density beam 5 passes through the thickness of the metal blank 1 which permits homogenizing the temperature within the thickness of the metal blank 1 without having a large affected region in width.

The high energy density beam 5 generates in the metal blank 1 a first region (not shown) termed "steam capillary" and around this first region a second region 10 termed the liquid region which has the shape of a cone of very small coniciity.

According to the law of propagation of the heat in the steel and as a function of the given distance d between the focusing point P and the joint plane 3, the isotherm 11 surrounding the liquid region 10 and located substantially in the region of said joint plane 3, generates a temperature t in the region of this joint plane 3 which is substantially equal to the melting temperature θ2 of the aluminium or aluminium alloy of the second metal blank 2 to within 10%.

In the present example, the temperature t is of the order of 650° C. which softens a certain thickness of the material of the second metal blank 2 and produces atomic bonds between the two materials of the two metal blanks 1 and 2.

If the temperature t in the region of the joint plane 3 is lower than the melting temperature θ2 of the aluminium or aluminium alloy, less 10%, there is obtained a slow diffusion of the atoms between the two materials and a slow welding rate, and even the impossibility of achieving a welded connection between the two metal blanks 1 and 2.

If the temperature t in the region of the joint plane 3 is higher than the melting temperature θ2 of the aluminium or aluminium alloy plus 10%, there is obtained the formation of intermetallic compounds in the region of the joint plane 3 and the formation of beads or holes.

Further, during the formation of the welded joint, a forging pressure is exerted on and in the direction of the joint plane 3.

This forging pressure which is constant or variable has for purpose to maintain the two metal blanks 1 and 2 in contact at their lateral faces and to avoid in this way any modification of the surface by the work atmosphere, as for example by oxidation, and in this way permits the production of atomic bonds between the two materials and the expulsion of the oxides, the impurities and the intermetallic compounds which might be found or might be formed in the region of the joint plane 3.

The lateral pressure exerted at the beginning for maintaining the metal blanks 1 and 2 in contact may be equal to that which permits the expulsion of the oxides and the impurities, or may progressively increase in the course of the welding to reach the value of the forging pressure permitting this expulsion.

Preferably, the axis Y—Y of the high energy density beam 5 makes with the vertical axis Y—Y passing through the focusing point P of the beam, an angle a of between 1° and 5° in such manner that the isotherms 11 generated by the high energy density beam 5 are parallel to the joint plane 3 to obtain a thermal front which is propagated in a direction parallel to this joint plane 3 as shown in FIG. 2.

In the course of the formation of the welded connection, intermetallic compounds tend to be formed and to weaken this welded connection.

In the case of the welding of steel with aluminium or aluminium alloy, these intermetallic compounds are formed by iron and aluminium or an iron and aluminium base-complex.

The density of the energy of the high energy density beam 5, the distance d between the focusing point P of the high energy density beam 5 and the joint plane 3, the lateral pressure and the welding rate are adjusted in such manner as to minimize the formation of a possible layer of intermetallic weakening compounds.

But, for limiting the growth of intermetallic compounds and consequently increasing the drawing deformability of the welded connections, several solutions may be envisaged.

The first solution consists in, during the formation of the welded joint, vaporizing in the region of the joint plane 3 and on each side of the two metal blanks 1 and 2 a protective gas selected for example from the group comprising nitrogen, carbon dioxide or a gas containing titanium.

The second solution consist in providing in the region of the joint plane 3 an external supply of elements inhibiting these intermetallic compounds.

The inhibiting elements are selected for example from the group comprising zinc, silicon, strontium and silver and the external supply of these inhibiting elements is achieved by means of a welding rod, powders, or an insert interposed in the joint plane between the lateral faces to be welded of the two metal blanks 1 and 2.

Another solution consists in vaporizing in the region of the joint plane 3 and on each side of the two metal blanks 1 and 2 a protective gas and simultaneously providing in the region of said joint plane 3 an external supply of elements inhibiting these intermetallic compounds.

The welding process according to the invention therefore has the advantage of making it possible to produce at high production rates a continuous metallic connection between two metal blanks of different natures, of which one is of steel having a melting temperature higher by more than 400° C. than the melting temperature of the metal of the second blank, such as for example steel with aluminium or aluminium alloy, which permits benefiting in the best possible way from the properties of each of the materials making up the same part.

The welding process according to the invention permits making motor vehicle parts, in particular body and structural parts, shaped by a drawing or folding operation on at least two lengths of different metallic materials, for example a blank of steel and a blank of aluminium or aluminium alloy.

What is claimed as new and desired to be secured by Letters Patent of the United States:

1. Process for butt welding two metal blanks of which a first blank is of steel and second blank is of aluminum or an aluminum alloy whose melting temperature is lower by more than 400° C. than the melting temperature of said steel, said process comprising the following steps:
    positioning said two metal blanks so that they are in contact in a joint plane between lateral faces thereof to be butt joined;
    maintaining said two metal blanks in contact with each other by clamping means;
    directing onto one of the principal faces of said first metal blank a high energy density beam which passes through said first metal blank and has a focusing point situated at a given distance from said joint plane so as to generate in the region of said joint plane a temperature equal to within 10% of said melting temperature of said metal of said second metal blank
    displacing said high energy density beam in a directional parallel to said joint plane so as to form a butt welded joint in said joint plane.

2. Process according to claim 1, wherein the distance between a vertical axis passing through said focusing point and said joint plane is between 5 and 50% of the thickness of the thinnest of said two metal blanks.

3. Process according to claim 1, wherein the distance between a vertical axis passing through said focusing point and said joint plane is between 20 and 40% of the thickness of the thinnest of said two metal blanks.

4. Process according to claim 1, wherein the distance between a vertical axis passing through said focusing point and said joint plane is between 0.2 and 0.4 mm for metal blanks having a thickness of 1 mm.

5. Process according to claim 1, wherein the optimum distance between a vertical axis passing through said focusing point and said joint plane is determined by the following formula:

$$d_{opt} = \frac{\sqrt{2/\pi e} \times P}{(T_f - T_o) \times 2 \times e_p \times \rho \times c}$$

in which:
    P is the linear energy required for melting the volume described by the melted welding region.
    e is the Napierian log of 10,
    $T_f$ is the melting temperature of the metal of the second metal blank,
    $T_o$ is the ambient temperature,
    $e_p$ is the thickness of the first steel blank,
    $\rho$ is the density of said steel,
    c is the specific heat of said steel.

6. Process according to claim 1, wherein said two metal blanks are maintained in contact in the vicinity of said joint plane.

7. Process according to claim 1, comprising, during said maintenance of said two metal blanks, exerting a lateral pressure in a direction toward said joint plane so as to take up machining clearances in the region of said joint plane.

8. Process according to claim 1, comprising, during the formation of said welded joint, exerting on said joint plane a forging pressure in a direction toward said joint plane for expelling oxides, impurities and intermetallic compounds formed in the region of said joint plane.

9. Process according to claim 1, comprising inclining the axis of said high energy density beam at an angle of between 1° and 5° to the vertical.

10. Process according to claim 1, wherein the metal of said second metal blank is selected from the group comprising aluminium and aluminium alloy.

11. Process according to claim 1, comprising, for limiting the growth of intermetallic compounds during the formation of said welded joint, vaporizing a protective gas in the region of said joint plane and on each side of said two metal blanks.

12. Process according to claim 11, wherein the said protective gas is selected from the group comprising nitrogen and carbon dioxide.

13. Process according to claim 1, comprising, for limiting the growth of intermetallic compounds during the formation of said welded joint, vaporizing a protective gas in the region of said joint plane and on each side of said two metal blanks, and simultaneously providing an external supply of elements for inhibiting said intermetallic compounds in the region of said joint plane.

14. Process according to claim 13, wherein said protective gas is selected from the group comprising nitrogen and carbon dioxide.

15. Process according to claim 13, wherein said inhibiting elements are selected from the group comprising zinc, silicon, strontium, and silver.

16. Process according to claim 1, comprising, for limiting the growth of intermetallic compounds during the formation of said welded joint, providing an external supply of elements for inhibiting said intermetallic compounds in the region of said joint plane.

17. Process according to claim 16, wherein said inhibiting elements are selected from the group comprising zinc, silicon, strontium, and silver.

18. A motor vehicle part, in particular, a body and a structural part of the vehicle, said vehicle part being shaped from a metal blank constituted by at least two elementary blanks, a first elementary blank of said at least two elementary blanks being of steel and a second elementary blank of said at least two elementary blanks being of aluminum or an aluminum alloy whose melting temperature is lower by more than 400° C. than the melting temperature of said steel of said first elementary blank, and said at least two elementary blanks being in a butt welded condition resulting from a process which comprises the steps of:

positioning said at least two metal blanks so that they are in contact in a joint plane between lateral faces thereof to be butt joined;

maintaining said two metal blanks in contact with each other by clamping means;

directing onto one of the principal faces of said first metal blank in a high energy density beam which passes through said first metal blank and has a focusing point situated at a given distance from said joint plane so as to generate in the region of said joint plane a temperature equal to within 10% of said melting temperature of said metal of said second metal blank;

displacing said high energy density beam in a direction parallel to said joint plane so as to form a butt welded joint in said joint plane.

19. Motor vehicle part according to claim 18, shaped by a press forming operation.

20. Motor vehicle part according to claim 18, wherein the metal of said second elementary blank is selected from the group comprising aluminium and aluminium alloy.

21. Motor vehicle part according to claim 20, shaped by a press forming operation.

* * * * *